United States Patent [19]

Kerschner et al.

[11] Patent Number: 5,777,321
[45] Date of Patent: Jul. 7, 1998

[54] SCANNING DEVICE WITH NON-CONTACT OPTICAL COMPONENTS

[75] Inventors: Ronald K. Kerschner; David K. Campbell, both of Loveland, Colo.

[73] Assignee: Hewlett-Packard Company, Palo Alto, Calif.

[21] Appl. No.: 592,904

[22] Filed: Jan. 29, 1996

[51] Int. Cl.⁶ .................................................. H01J 3/14
[52] U.S. Cl. ........................ 250/235; 250/239; 358/474
[58] Field of Search ........................ 250/208.1, 234–236, 250/556, 239; 358/473–474; 382/313, 319; 235/472, 462

[56] References Cited

U.S. PATENT DOCUMENTS

| | | | |
|---|---|---|---|
| 4,703,186 | 10/1987 | Kakayama et al. | 250/566 |
| 4,709,144 | 11/1987 | Vincent | 250/226 |
| 4,819,083 | 4/1989 | Kawai et al. | 358/294 |
| 4,870,268 | 9/1989 | Vincent et al. | 250/226 |
| 4,894,523 | 1/1990 | Chadima, Jr. et al. | 235/472 |
| 4,899,228 | 2/1990 | Sano et al. | 358/473 |
| 4,926,041 | 5/1990 | Boyd | 250/226 |
| 4,967,188 | 10/1990 | Collins, Jr. | 235/462 |
| 4,969,054 | 11/1990 | Tsuji et al. | 358/473 |
| 5,019,703 | 5/1991 | Boyd et al. | 250/208.1 |
| 5,032,004 | 7/1991 | Steinle | 250/226 |
| 5,038,028 | 8/1991 | Boyd et al. | 250/208.1 |
| 5,040,872 | 8/1991 | Steinle | |
| 5,044,727 | 9/1991 | Steinle | 250/226 |
| 5,175,422 | 12/1992 | Koizumi et al. | 235/472 |
| 5,182,450 | 1/1993 | Pan | 250/234 |
| 5,227,620 | 7/1993 | Elder, Jr. et al. | 250/208.1 |
| 5,301,243 | 4/1994 | Olschafskie et al. | 382/59 |
| 5,306,908 | 4/1994 | McConica et al. | 250/234 |
| 5,381,020 | 1/1995 | Kochis et al. | 250/566 |
| 5,410,347 | 4/1995 | Steinle et al. | 358/512 |
| 5,430,558 | 7/1995 | Sohaei et al. | 358/473 |
| 5,434,680 | 7/1995 | Noda et al. | 358/471 |

FOREIGN PATENT DOCUMENTS

| | | |
|---|---|---|
| A-0168 256 | 1/1986 | European Pat. Off. |
| A-0 270 686 | 6/1988 | European Pat. Off. |
| 94301507 | 10/1994 | European Pat. Off. |
| A-63 042 275 | 7/1988 | Japan |
| A-04 319 857 | 11/1992 | Japan |
| A-88 01123 | 2/1988 | WIPO |

Primary Examiner—Que Le

[57] ABSTRACT

A hand-held scanning device is disclosed in which the scanning device housing window is located such that it does not come into contact with the object being scanned while a scan is being performed. This location of the window eliminates window damage caused by contact with the object being scanned. This location also results in the window being located out of the focus area of the scanning device optical system. Accordingly, any defects occurring in the window will be out of focus and, thus, less detrimental to acquired image quality. A light source lens may be integrally formed in the same assembly as the window and this assembly may provide support for the light source.

16 Claims, 13 Drawing Sheets

SCANNING DEVICE WITH NON-CONTACT OPTICAL COMPONENTS

FIELD OF THE INVENTION

The present invention relates generally to optical scanners and, more particularly, to an optical scanner window assembly that does not contact the scanned object while a scan is being performed.

BACKGROUND OF THE INVENTION

Optical scanners are well-known in the art and produce machine-readable data which is representative of the image of an object, e.g. a page of printed text. Optical scanners generally employ line-focus systems which image an object by sequentially focusing narrow "scan line" portions of the object onto a linear photosensor array by sweeping a scanning head over the object.

In a line-focus system, a light beam from an illuminated line object is imaged by a lens on a linear photosensor array which is positioned remotely from the line object. The linear photosensor array is a single dimension array of photoelements which correspond to small area locations on the line object. These small area locations on the line object are commonly referred to as "picture elements" or "pixels." In response to light from its corresponding pixel location on the line object, each photosensor pixel element in the linear photosensor array (sometimes referred to simply as "pixels") produces a data signal which is representative of the light intensity that it experiences during an immediately preceding interval of time known as a sampling interval. All of the photoelement data signals are received and processed by an appropriate data processing system.

In a color optical scanner, a plurality of spectrally separated imaging beams (typically red, green and blue beams) must be projected onto photosensor arrays. Some color optical scanners employ beam splitter devices for spectrally separating an imaging light beam into color component beams. These separate color component beams are projected onto separate linear photosensor arrays. Other optical scanners project color component images on a single linear array in a series of separate scanning passes.

The construction and operation of color optical scanners employing beam splitter assemblies and photosensor arrays are disclosed in the following U.S. Pat. Nos.: 5,410,347 of Steinle et al. for COLOR OPTICAL SCANNER WITH IMAGE REGISTRATION HOLDING ASSEMBLY; 4,870,268 of Vincent et al. for COLOR COMBINER AND SEPARATOR AND IMPLEMENTATIONS; 4,926,041 of Boyd for OPTICAL SCANNER (and corresponding EPO patent application no. 90306876.5 filed Jun. 22, 1990); 5,019,703 of Boyd et al. for OPTICAL SCANNER WITH MIRROR MOUNTED OCCLUDING APERTURE OR FILTER (and corresponding EPO patent application no. 90312893.2 filed Nov. 27, 1990); 5,032,004 of Steinle for BEAM SPLITTER APPARATUS WITH ADJUSTABLE IMAGE FOCUS AND REGISTRATION (and corresponding EPO patent application no. 91304185.1 filed May 5, 1991); 5,044,727 of Steinle for BEAM SPLITTER/COMBINER APPARATUS (and corresponding EPO patent application no. 91303860.3 filed Apr. 29, 1991); 5,040,872 of Steinle for BEAM SPLITTER/COMBINER WITH PATH LENGTH COMPENSATOR (and corresponding EPO patent application no. 90124279.2 filed Dec. 14, 1990 which has been abandoned); and 5,227,620 of Elder, Jr. et al. for APPARATUS FOR ASSEMBLING COMPONENTS OF COLOR OPTICAL SCANNERS (and corresponding EPO patent application no. 91304403.8 filed May 16, 1991), which are all hereby specifically incorporated by reference for all that is disclosed therein.

A hand-held optical scanning device is an optical scanner which is moved across a scanned object, e.g. a page of text, by hand. Optical systems for hand-held scanning devices must generally be very compact due to the relatively small size of hand-held scanning devices.

Rollers may be provided on a hand-held scanning device to guide the device across the object to be scanned and also to provide data to the scanning device microprocessor regarding the speed at which the scanning device is being moved over the scanned object. These rollers may also serve to control the speed at which an operator moves the scanning device across the scanned object.

The construction and operation of hand-held optical scanning devices employing such rollers is disclosed in the following U.S. Pat. Nos.: 5,381,020 of Kochis et al. for HAND-HELD OPTICAL SCANNER WITH ONBOARD BATTERY RECHARGING ASSEMBLY and 5,306,908 of McConica et al. for MANUALLY OPERATED HAND-HELD OPTICAL SCANNER WITH TACTILE SPEED CONTROL ASSEMBLY (and corresponding EPO patent application no. 94301507.3 filed Mar. 2, 1994), which are all hereby specifically incorporated by reference for all that is disclosed therein.

In most hand-held optical scanning devices, the optical components and electronics of the scanning device are enclosed in a housing which is adapted to be grasped by the hand of a user while a scan is being performed. The housing generally also rotatably mounts the roller or rollers previously described.

In such scanning devices, it is generally desirable to completely seal the portion of the housing enclosing the optical components and electronics. The housing, sealed in this manner, prevents dust, moisture and other potential contaminants from entering the interior of the housing and contaminating the optical components and associated scanning device electronics.

Because the image beam from the object must pass through the housing to reach the optical components, a sealed housing, as described above, must be provided with a transparent window. This window is often constructed of glass and mounted in the bottom wall of the scanning device housing. In many cases, however, the window is formed of a transparent plastic material in order to reduce the overall weight of the scanning device.

In conventional hand-held scanning devices, the window is located such that it rests directly on the object being scanned and actually slides along the object when the scanning device is moved across the object to perform a scanning operation. This presents a problem since such sliding contact between the window and the object often results in scratching of the window material. Although plastic windows are more prone to such scratching, glass windows may also be scratched. Such scratching may result, for example when the scanning device is moved across objects which are dirty or gritty or when a staple is encountered.

A scratched or otherwise damaged window will distort the image beam passing through the window and thus result in degradation of the quality of the image acquired by the hand-held scanning device. Image quality may also be adversely affected by a window which contains flaws not caused by contact with the object. Such flaws may be more prevalent in less expensive window materials.

Locating the window adjacent to the object is also detrimental to image quality in another way. The optical system of a scanning device must be focused on the object being scanned in order to maximize acquired image quality. Locating the window adjacent the object, as in conventional scanning devices, necessarily places the window in-focus for the optical system. Accordingly, any defects or flaws, such as scratches, on the window will be imaged on the photosensor array and thus more significantly degrade the quality of the acquired image.

Thus, it would be generally desirable to provide an apparatus which overcomes these problems associated with hand-held optical scanning devices.

SUMMARY OF THE INVENTION

The present invention is directed to a hand-held scanning device in which the scanning device housing window is located such that it does not come into contact with the object being scanned while a scan is being performed. Specifically, the window is moved upwardly, optically toward the scanning device photosensor array and away from the object being scanned.

This location of the window addresses the problems discussed above with respect to window damage caused by contact with the object being scanned. By moving the window out of contact with the object, it is much less likely to become scratched.

This window configuration also results in the window being located out of the focus area of the scanning device optical system. Accordingly, any defects occurring in the window will be out of focus and, thus, less detrimental to acquired image quality.

The scanning device may also include a light supplying mechanism which has a lens associated therewith. The lens focuses light from the light supplying mechanism onto the object to be scanned and thus facilitates generation of the scanning device imaging light beam. The light source lens may be located in a window assembly which may also integrally house the window described above. The configuration of the window assembly causes the lens to remain out of contact with the object being scanned during a scanning operation. Spacing the lens from the object in this manner prevents damage to the lens which might otherwise be caused by sliding contact with the object. The window assembly may be configured to support the light supplying mechanism thereon.

DETAILED DESCRIPTION OF THE INVENTION

Figure 1:
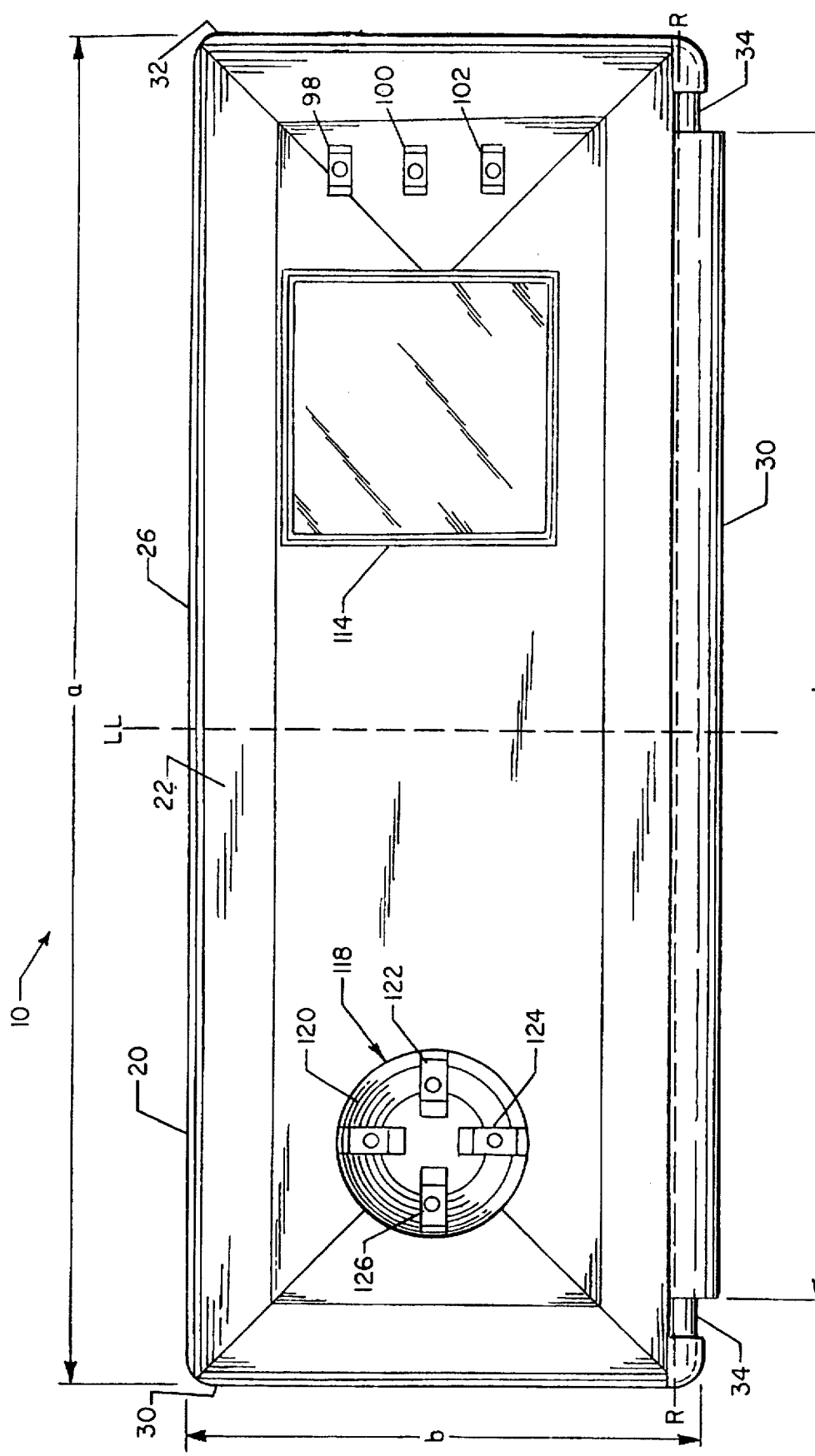
FIG. 1 is a front elevation view of a hand-held scanning device.

FIGS. 1–14, in general, illustrate a photoelectric imaging apparatus 10 for producing machine-readable data representative of imaged objects 54. The imaging apparatus includes a photosensor assembly 50, optical components 42, 44, 46, 48 arranged along a light path 56 extending between an object 54 which is to be imaged and the photosensor assembly 50, a light supplying mechanism 60 positioned in illuminating relationship with the object 54 and a window assembly 150. The window assembly 150 includes a window portion 152 located within the light path 56 between the optical components 42, 44, 46, 48 and the object 54 and a lens portion 66 operatively associated with the light supplying mechanism 60.

FIGS. 1–14 also illustrate, in general, a method of scanning an object 54 with a photoelectric imaging apparatus 10 having a window assembly 150 which includes a window portion 152 and a lens portion 66. The lens portion 66 is operatively associated with a light supplying mechanism 60. The method may include the steps of making contact between the object 54 and the imaging apparatus 10, performing a scan while causing relative movement between the imaging apparatus 10 and the object 54, maintaining the window assembly 150 in a non-contact relationship with the object 54 while the scan is being performed and maintaining the window assembly 150 in closing relationship with an opening in an optical components housing assembly 20 while the scan is being performed.

Having thus described the hand-held scanning device in general, the device will now be described in further detail.

FIG. 1 illustrates a hand-held scanning device 10. The scanning device 10 includes a housing 20 which may be a generally parallelepiped-shaped member having a generally flat front surface 22, a generally flat rear surface 24, FIG. 2, a generally flat top surface 26, FIG. 3; a generally flat bottom surface 28, and generally flat opposite end surfaces 30, 32, FIG. 1. The scanning device 10 has a central axis LL, FIGS. 1, 3, 4, and 7–11.

It is to be understood that terms such as "front", "rear", "top", "bottom", "horizontal" and "vertical" are used herein for illustration purposes only. In actual use, the scanning device 10 can be used in almost any orientation, thus making terms such as "front", "rear", "top", "bottom", "horizontal" and "vertical" relative to the orientation of the scanning device.

Figure 3:
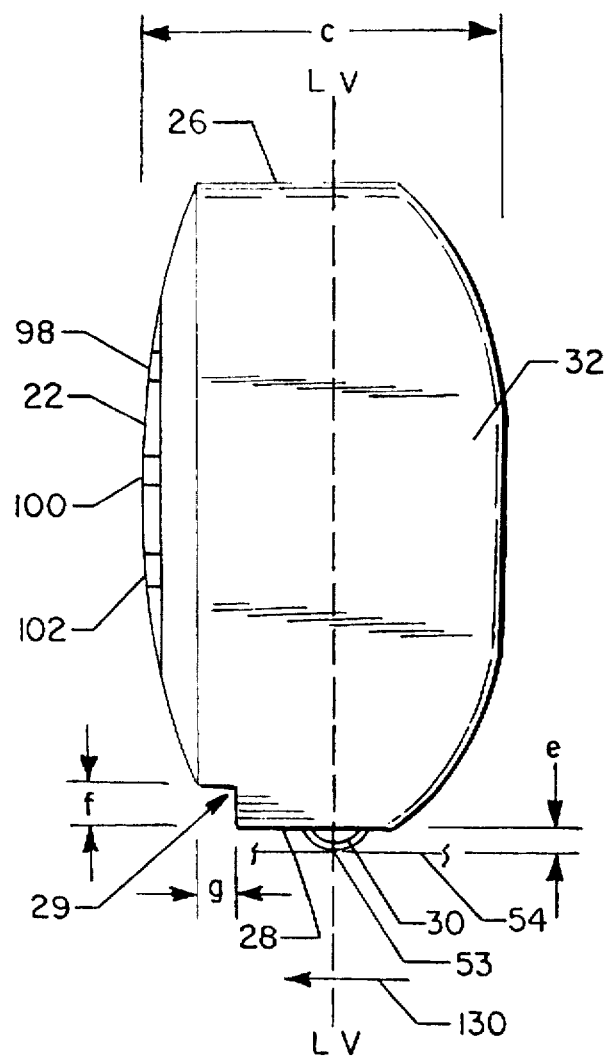
FIG. 3 is a side elevation view of the hand-held scanning device of FIG. 1.

Housing 20 may have a length "a" of, e.g., 9.5 inches, FIG. 1; a height "b" of, e.g., 3.75 inches, and a depth "c" of, e.g., 1.75 inches, FIG. 3.

Figure 4:
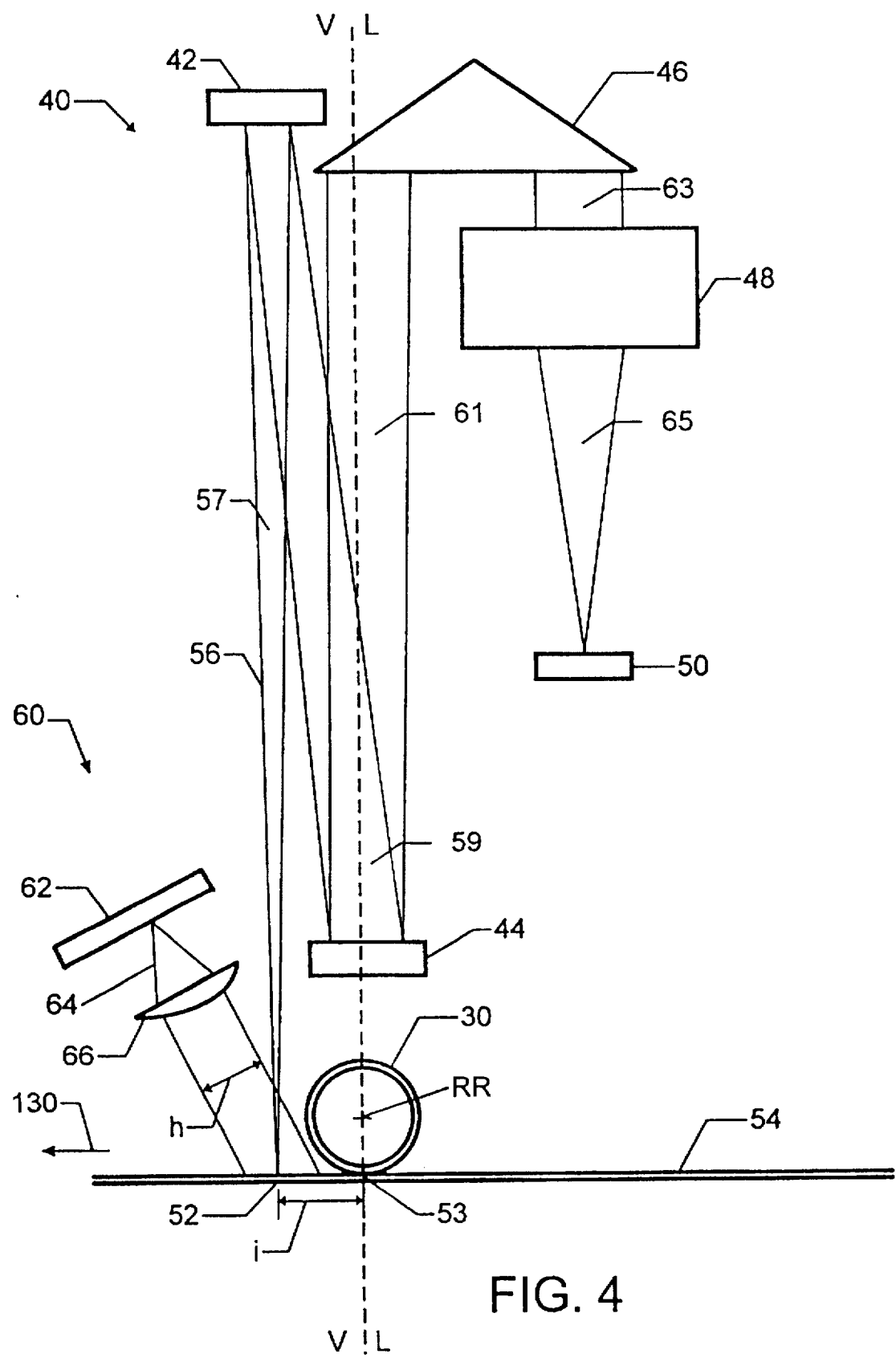
FIG. 4 is a schematic side elevation view of the optical system of the hand-held scanning device of FIG. 1.

Housing 20 contains an imaging assembly 40 as shown schematically in FIG. 4. Imaging assembly 40 may contain mirrors 42 and 44, a prism 46, and an imaging lens 48. These optical components fold and resize the image beam 56 and serve to focus a line portion 52 of a scanned object 54 onto a photosensor array 50 in a manner that is well-known in the art. A data signal 82, representative of scanned line images, is transmitted by photosensor array 50 to a microprocessor 80 which is located in housing 20, FIG. 5. Imaging assembly 40 may be either a monochrome or a color imaging assembly as is well known in the art.

A light source 60 is also provided in housing 20 as shown in FIG. 4. The light source 60 may include an LED (light emitting diode) board 62. LED board 62 generates light 64, in a well-known manner, approximately along the length "d" of the housing 20, FIG. 1. The light 64 is directed through a lens 66, FIG. 4, and then onto the scanned object 54. In this manner, the line portion 52 of the scanned object 54 is illuminated in order to allow image beam 56 to be generated.

Imaging assembly 40 may be configured in a vertical orientation (i.e., transverse to the plane of the scanned object 54) as shown in FIG. 4. The configuration of the mirrors 42 and 44, the prism 46 and the photosensor array 50 cause the imaging light beam 56 to be folded into a plurality of substantially vertically extending portions 57, 59, 61, 63, 65 rather than horizontally extending portions. The length of portion 57 may be about 80 mm; the length of portion 59 may be about 59 mm; the length of portion 61 may be about 54 mm; the length of portion 63 may be about 3 mm; and the length of portion 65 may be about 20 mm. The length of the light beam within the prism 46 may be about 18 mm and the length of the light beam within the lens 48 may be about 6 mm. The lengths 30 described above result in the overall length of imaging light beam 56 being approximately 240 mm. Due to the configuration described above, at least 80% of the light path 56 will extend in a substantially vertical direction, i.e. a direction perpendicular to the object 54 at the location of the line portion 54.

This arrangement causes the height "b", FIG. 1 of the scanning device housing to be greater than its depth "c", FIG. 3. It has been found that this configuration of the housing allows easy grasping by a human hand and thus facilitates ease of use during a scanning operation. In a preferred embodiment, the housing height "b" may be at least about twice the housing depth "c".

Figure 5:
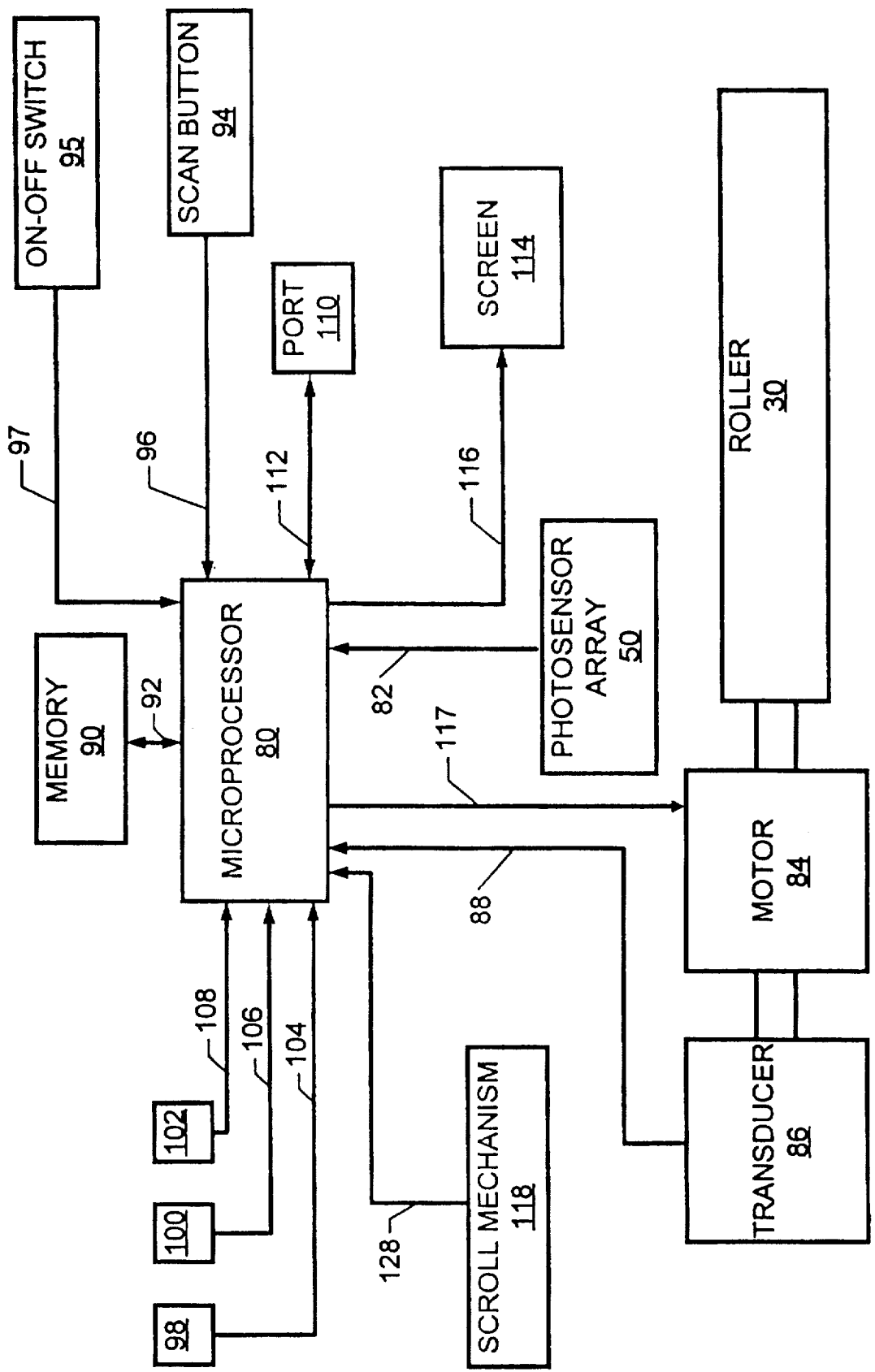
FIG. 5 is a schematic illustration showing the relationship between various functional components of the hand-held scanning device of FIG. 1.

Housing 20 also contains a memory storage device 90, FIG. 5. The memory storage device 90 is connected to microprocessor 80 by a connection 92. The memory storage device 90 serves to store images of scanned objects acquired by the hand-held scanning device 10. Memory storage device 90 may be a solid state memory device, capable of storing data equivalent to approximately fifty 8.5 inch by 11 inch pages of text. Memory storage device 90 may, alternatively be constructed as an integral part of microprocessor 80, rather than as a separate unit.

Figure 2:
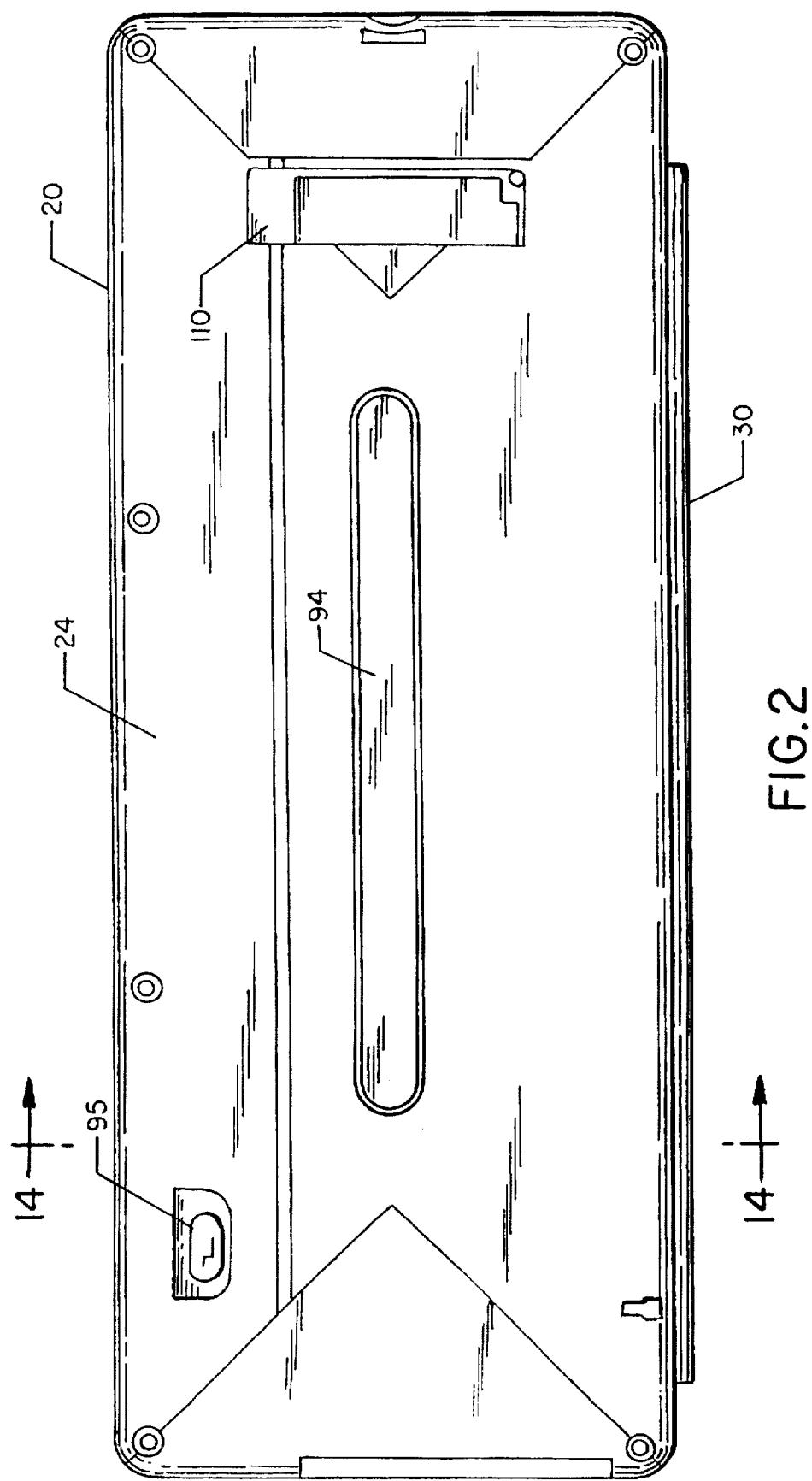
FIG. 2 is a rear elevation view of the hand-held scanning device of FIG. 1.

A scan button 94 is located on the rear surface 24 of housing 20, FIG. 2. Scan button 94 is connected to microprocessor 80 as illustrated by reference numeral 96 in FIG. 5. Scan button 94 is configured so as to be operable by a user when performing a scanning operation. Depressing scan button 94 causes microprocessor 80 to carry out a scanning operation.

An on-off switch 95 may be provided on the rear surface 24 of housing 20, FIG. 2. On-off switch 95 serves to power the hand-held optical scanning device 10 on and off in a conventional manner and may be connected to microprocessor 80 by a connection 97 as illustrated in FIG. 5.

Function buttons 98, 100, 102 may be located on the front surface 22 of housing 20 as shown in FIG. 1. The function buttons 98, 100, 102 allow a user of the hand-held scanning device 10 to communicate with the microprocessor 80 in order to accomplish such functions as a user interface for file management, image editing, etc. Function buttons 98, 100, 102 are connected to microprocessor 80 as indicated by reference numerals 104, 106, 108 respectively, FIG. 5.

An input-output port 110 is located on the rear surface 24 of housing 20, FIG. 2. Input/output port 110 is connected to microprocessor 80 as shown schematically by reference numeral 112 in FIG. 5. Input/output port 110 allows image data acquired by the hand-held scanning device 10 and/or stored by the microprocessor 80 and the memory storage device 90 to be transmitted or "downloaded" to a computer or other data-handling device. Input/output port 110 may be a physical connection device such as an industry standard "IEEE-1284" type connector or may be a non-contact connection apparatus such as an infrared communication port.

A screen 114, FIG. 1, may be provided on the front surface 22 of housing 20 for displaying images of objects that are being scanned and also for displaying images of previously scanned objects that are stored by microprocessor 80 and/or memory device 90. Screen 114 is connected to microprocessor 80 by connection 116, FIG. 5. Screen 114 may be used to display images that have been previously scanned and stored in microprocessor 80 and/or memory device 90. In this manner, the user of hand-held scanning device 10 can ensure that desired scan objects have been adequately captured before downloading the images to a computer or other data handling device.

Screen 114 may also be used to display status information generated by the microprocessor 80. Additionally, screen 114 may be used to display menu information affording a user access to various scanning-related functions provided by the microprocessor 80.

Screen 114 may be a liquid crystal display (LCD) type screen of well known configuration. Such an LCD screen may be of the type commonly known in the industry as a reflective STN display. Screen 114 may have dimensions of approximately 2 inches by 2 inches.

A scroll mechanism 118 may be provided on the front surface 22 of housing 20, FIG. 1. Scroll mechanism 118 is provided with direction buttons 120, 122, 124 and 126 which may be activated by a user to scroll images displayed on the screen 114. Scroll mechanism 118 may also be used to move a curser or other pointer on the screen 114 to accomplish various functions as is well known. Scroll mechanism 118 is connected to microprocessor 80 by connection 128, FIG. 5.

To allow the hand-held scanning device 10 to be moved across an object 54 that is to be scanned, a roller 30 is provided on the bottom surface 28 of housing 20, FIGS. 1–3. The roller 30 may be rotatably mounted in the housing 20 by axle portions 32 and 34, FIG. 1. Mounted in this manner, the roller 30 is rotatable about the roller axis RR, FIGS. 4, 9 and 10. The roller axis RR intersects the imaging device central axis LL. Roller 30 may have a length "d" of, e.g., 8 inches and an outside diameter of, e.g., 0.5 inches. Roller 30 may be constructed having a metal core covered by an elastomeric coating.

Referring to FIG. 5, the roller 30 may be connected to a drive motor 84 which turns the roller 30 and thus drives the scanning device 10 along an object to be scanned 54 while a scan is being performed. A transducer 86 may be connected to the motor 84. Transducer 86 sends a signal 88 to microprocessor 80 which is indicative of the speed and displacement of the roller 30. In this manner, the microprocessor can determine the displacement of the hand-held scanning device 10 during a scanning operation in order to correlate data signal 82 from the photosensor array 50 to the proper location on the scanned object 54. Microprocessor 80 controls the activation and the speed of the motor 84 via a connection 117.

A battery, not shown, may also be provided within the housing 20 to provide power for the hand-held optical scanning device 10 in a conventional manner. The battery may be rechargeable as is well known. Alternatively, the scanning device 10 may be powered by an external power source via, e.g., a power cord.

Figure 6:
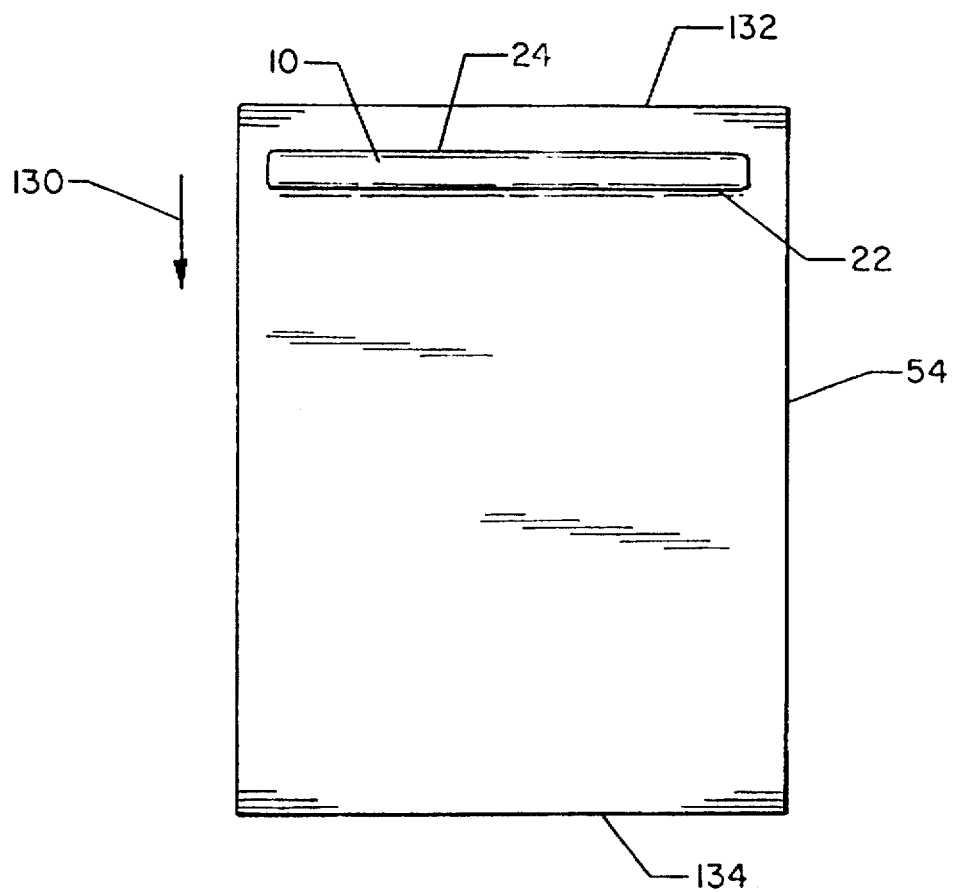
FIG. 6 is a schematic illustration showing the hand-held scanning device of FIGS. 1–5 being used to scan an object.

FIG. 6 shows the hand-held scanning device 10 positioned to begin a scan of an object 54 such as a document. Document 54 may be, for example an 8 ½ inch by 11 inch page of text. To scan the document 54, the scanning device 10 is first located at one end 132 of the document 54 with the roller 30 of the scanning device 10 resting on the document 54. The user then depresses scan button 94 and holds it down while the scanning device 10 moves across the document 54 in the scanning direction 130. As the scanning device is moved, imaging assembly 40 images line portions of the scanned object onto photosensor array 50 which, in turn, sends signal 82 indicative of the scanned line portions to the microprocessor 80. Photosensor array 50 transmits signal 82 representing line images of the object being scanned each time a sampling interval occurs as is well-known. A typical sampling interval may be, for example, 1/300th of an inch. When the scanning device 10 reaches the opposite end 134 of the document 54, the user may release the scan button 94 causing the scanning device 10 to halt its movement.

The hand-held scanning device 10 is configured so that contact with the object to be scanned 54 occurs only along a single line 53, FIG. 4. This line is transverse to the scanning direction 130, FIG. 6, and is defined by the roller 30, located on the bottom portion of the scanning device. The scanning device 10 is, thus, fully supported by the single roller 30 when performing a scan. Because the scanning device 10 is supported by only one roller, the imaging assembly 40 of the scanning device 10 may be moved very close to the edge of the object 54 while remaining fully supported. The hand-held scanning device 10 is able, therefore, to capture substantially all desired features of an object to be scanned (e.g., a page of printed text) while remaining fully supported.

The use of such a single roller configuration also allows a user to view the area being scanned by the hand-held scanning device 10 while a scan is being performed. Because the illumination light 64 is not hidden beneath the scanner structure, a user may view this light on the object 54 while the scan is being performed. This ability to view the illumination light 64 allows a user to determine what portion of the object 54 is being scanned by the scanning device 10. In this manner, the user can ensure that all desired features, e.g., text, on the object 54 are scanned.

Figure 7:
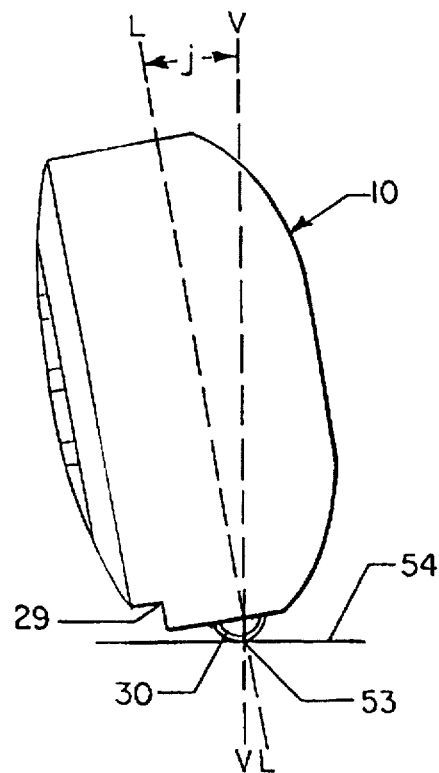
FIG. 7 is a side elevation view of the hand-held scanning device of FIG. 1 in a tilted forward position.
Figure 8:
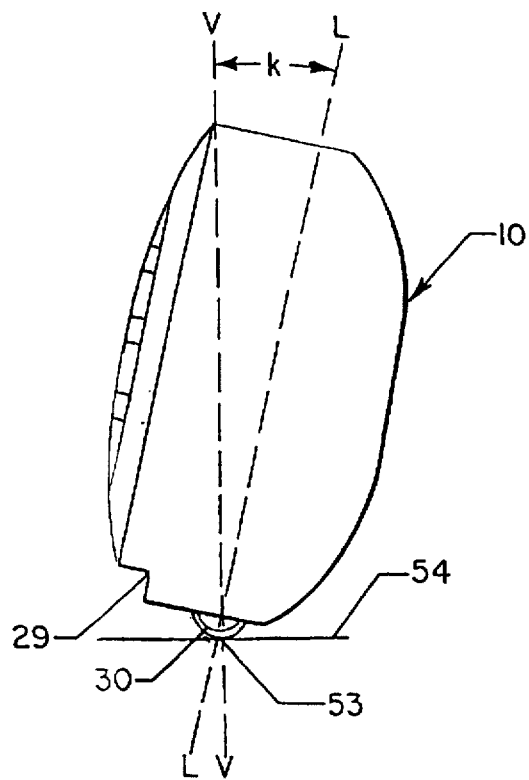
FIG. 8 is a side elevation view of the hand-held scanning device of FIG. 1 in a tilted rearward position.

To facilitate viewing of the illuminated scan area by a user, a notch 29 may be provided in the front and bottom surfaces 22, 28 of the hand-held scanning device, FIGS. 3, 7, 8. The notch 29 allows a user of the scanning device an unobstructed view of the area being scanned. Notch 29 may have a height "f" of, e.g., 0.22 inches, and a depth "g" of, e.g., 0.28 inches, FIG. 3.

Because the hand-held scanning device 10 is provided with only one roller, a user may inadvertently tilt the scanning device forward and backward while a scan is being performed. Referring to FIGS. 7 and 8, a normal plane VV is defined by the roller axis RR and the contact line 53 between the roller 30 and the object 54. In the case of a planar object, e.g., the object 54 shown in FIGS. 7 and 8, the normal plane VV will always be perpendicular, or normal, to the plane of the object. Often, however, objects to be scanned are not planar. One example of such a non-planar object is an open book, in which the page to be scanned might assume a curved profile.

Figure 11:
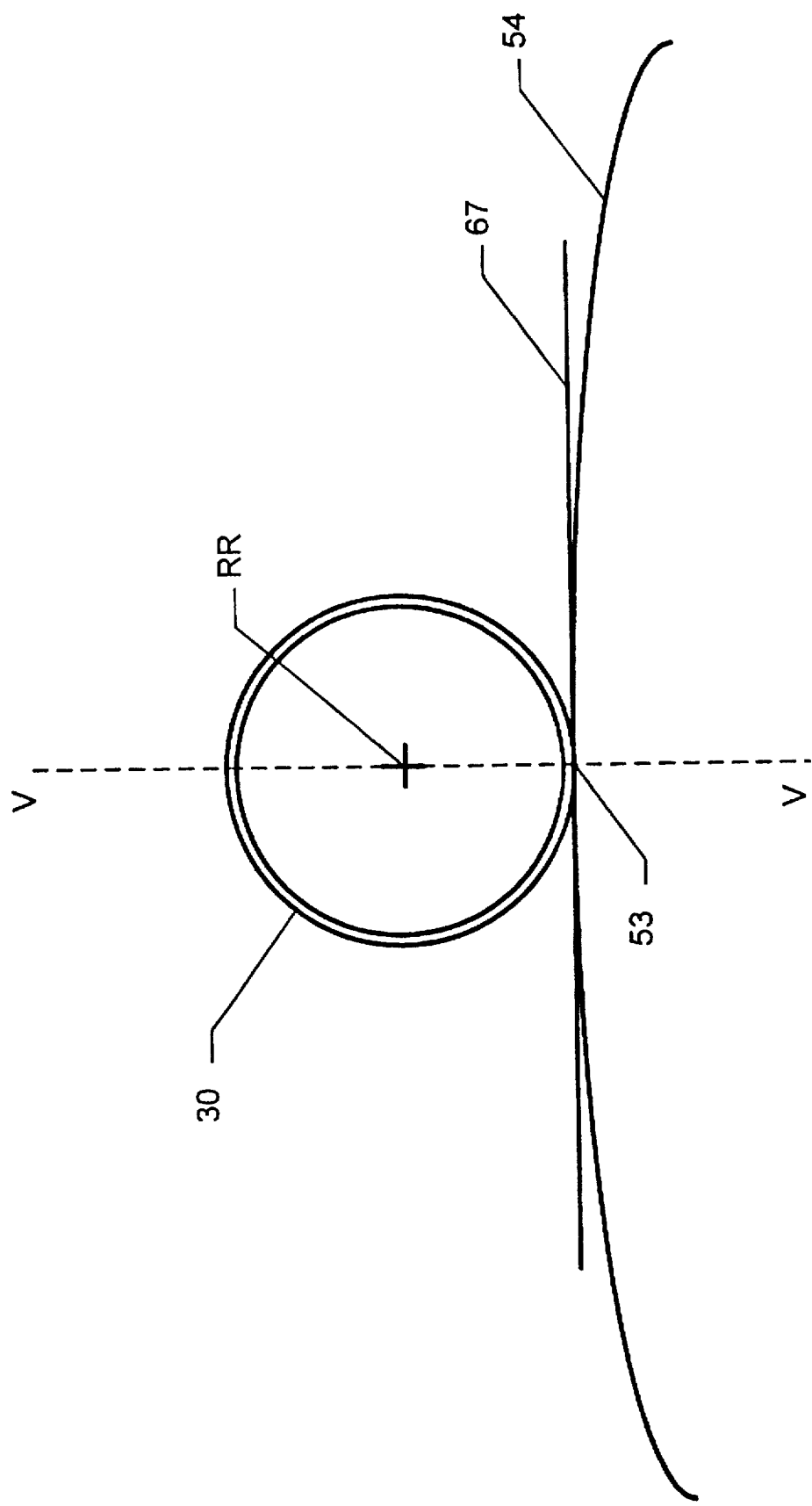
FIG. 11 is a schematic illustration of the hand-held scanning device of FIG. 1 scanning a curved surface of an object.

FIG. 11 schematically illustrates an example of an object 54 having a non-planar profile. In such a case, the normal plane VV is still defined by the roller axis RR and the contact line 53 as shown. The normal plane VV is also perpendicular to a tangent plane 67 which is parallel to the tangent of the outer surface of roller 30 at the contact point 53. In the case of a planar object 54 as shown in FIGS. 7 and 8, the tangent plane 67 will be coincident with the plane of the object 54.

Figure 9:
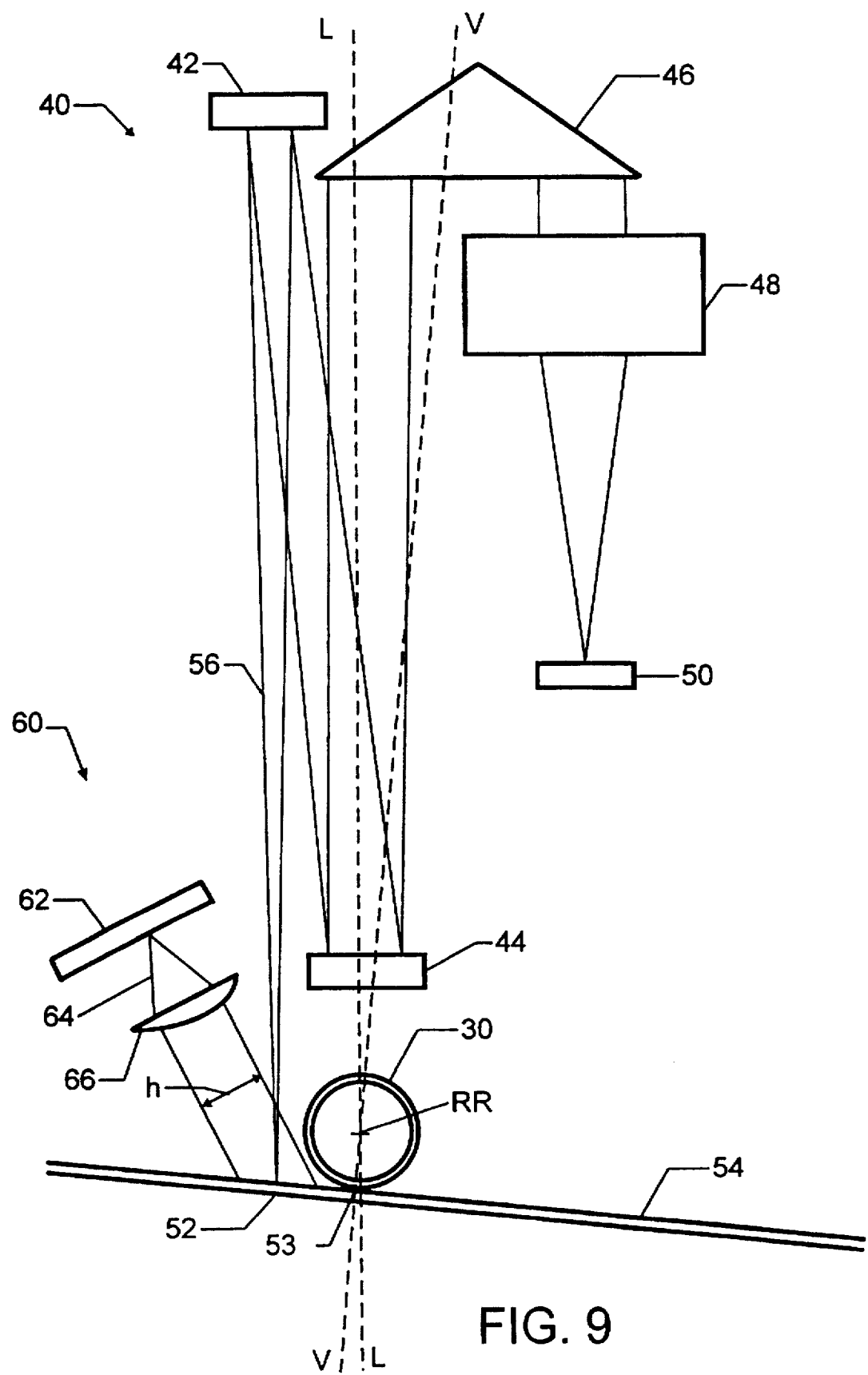
FIG. 9 is a schematic side elevation view of the optical system of the hand-held scanning device of FIG. 1 in a tilted forward position.
Figure 10:
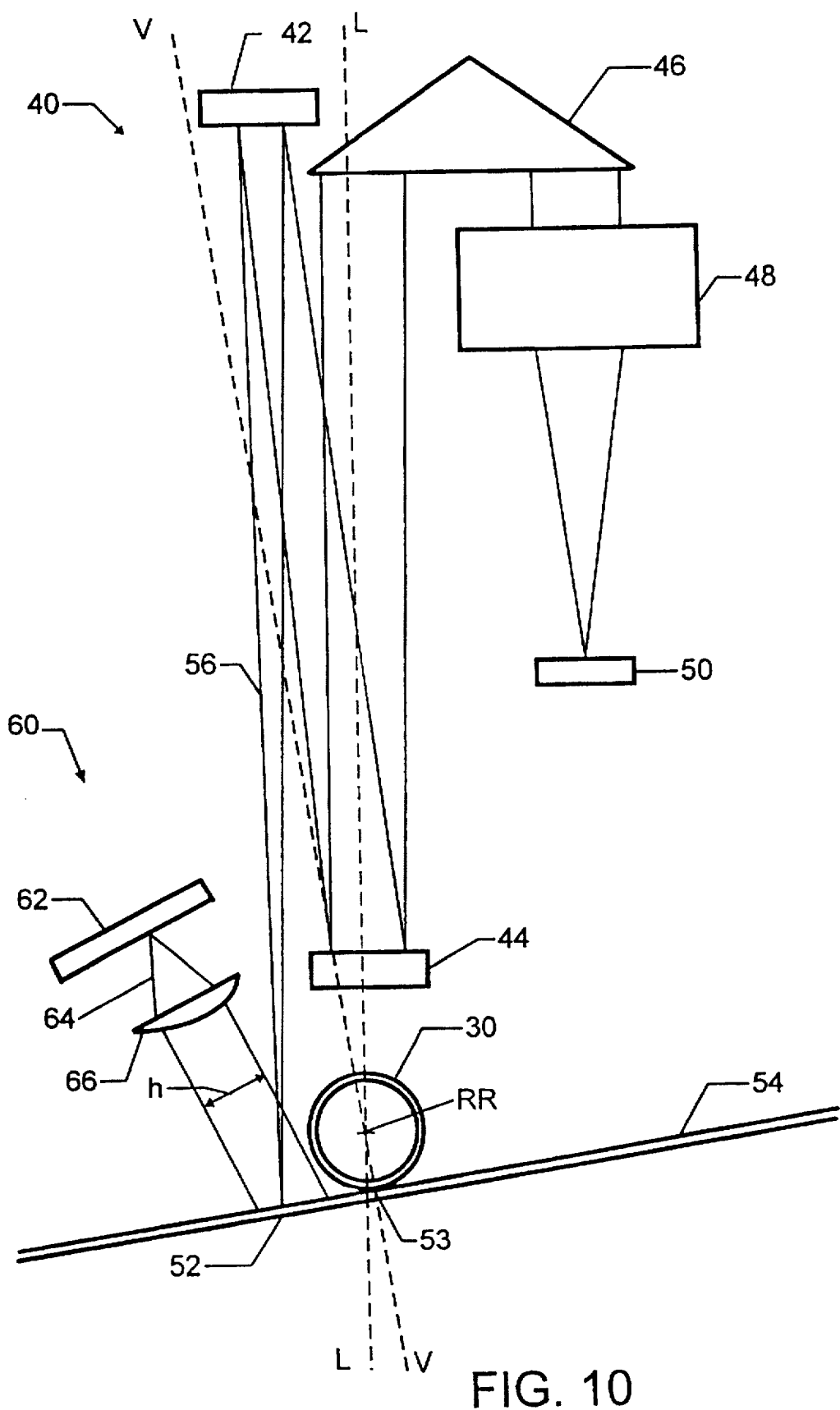
FIG. 10 is a schematic side elevation view of the optical system of the hand-held scanning device of FIG. 1 in a tilted rearward position.

FIG. 7 shows the hand-held scanning device 10 in a tilted forward configuration in which the axis LL of the scanning device 10 is inclined "j" degrees forwardly of the normal plane VV. FIG. 8 shows the hand-held scanning device 10 in a tilted backward configuration in which the axis LL of the scanning device is inclined "k" degrees rearwardly of the normal plane VV. FIGS. 9 and 10 schematically illustrate the effect of forward and rearward tilting, respectively, on the imaging assembly 40. FIG. 4 schematically illustrates the imaging assembly 40 when the hand-held scanning device 10 is in a non-tilted configuration in which the axis LL of the scanning device lies within the normal plane VV.

It has been determined that a typical user is easily able to perform a scan with the hand-held scanning device 10 without tilting the device more than an angle "j" of 10 degrees forwardly or more than an angle "k" of 10 degrees rearwardly of the normal plane VV. Accordingly, the scanning device is designed to accommodate such tilting during a scanning operation without significant degradation of acquired image quality as will now be explained in detail.

The scanning device 10 is constructed to ensure that no portion of the housing 20 will contact the scanned object 54 when the device is tilted up to 10 degrees from the normal plane VV in either direction. To accomplish this, the roller 30 is configured to protrude a sufficient distance beneath the bottom surface 28 of the housing 20, FIG. 3. It has been found, for example, that locating the outer circumference of the roller 30 a distance "e" of at least about 0.125 inches below the bottom surface 28 of housing 20 is sufficient for this purpose.

As can be seen from FIG. 9, when the scanning device 10 is tilted forward (i.e., in the scanning direction 130), the effective distance between the lens 48 and the line portion 52 on document 54 becomes shorter.

Conversely, as can be seen from FIG. 10, when the scanning device 10 is tilted backward (i.e., opposite to the scanning direction 130), the effective distance between the lens 48 and the line portion 52 on document 54 becomes longer. Accordingly, the line portion 52 tends to move out of the focus of lens 48 as the scanning device 10 is tilted.

To solve this problem, the scanning device 10 may be provided with a lens 48 having a relatively high f-number. As is well-known, a lens with a higher f-number will have a greater depth of field than a lens with a lower f-number. Accordingly, the use of a higher f-number lens enables the hand-held scanning device 10 to keep the line image 52 adequately in focus throughout the tilting movements described above. It has been found that a lens having an f-number of at least about 4 and a depth of field of at least about 0.20 inches is sufficient to keep the line portion 52 in adequate focus throughout tilting movements of up to about 10 degrees from the normal plane VV. Preferably, the lens 48 has an f-number of about 4 and a depth of field of about 0.20 inches. Because a higher f-number lens tends to capture less light, a more sensitive photosensor array 50 may be used in the scanning device 10. In one example, a photosensor array having a signal to noise ratio of about 60:1 may be used.

To further minimize the adverse effects of tilt on acquired image quality, the hand-held scanning device 10 is configured so as to minimize the distance "i" between the roller contact line 53 and the line portion 52, FIG. 4. As best illustrated in FIGS. 9 and 10, when the scanning device 10 is tilted, as described above, it rotates about the roller rotation axis RR. Accordingly, the longer the distance "i", the greater will be the defocusing relative movement between the line portion 52 of the object to be scanned 54 and the photosensor array 50. Conversely, minimizing the distance "i", reduces this defocusing effect. It has been found that maintaining the distance "i" at about 0.30 inches or less serves to adequately minimize the de-focusing effect.

Another problem caused by the tilting described above is that the line image tends to move out of the illumination light 64 as the scanning device is tilted. As illustrated in FIG. 9, when the scanning device 10 is tilted forwardly, the line portion 52 moves closer to the contact line 53 between the roller 30 and the object 54. Conversely, as illustrated in FIG. 10, when the scanning device 10 is tilted rearwardly, the line portion 52 moves further away from the contact line 53. Thus, if a conventional relatively narrow-width illumination light were used in the hand-held scanning device 10, the line portion 52 would move out of the lit area when tilted. This would result in degradation of the image acquired by the scanning device 10 since illumination of the line portion 52 is necessary for optimum acquired image quality.

To ensure adequate illumination of the line portion 52 while tilting, the scanning device 10 may be provided with a relatively wide illumination light beam 64 as shown in FIGS. 4, 9 and 10. The width of this light beam is determined by the configuration of the lens 66. In this manner, a wider area on object 54 is illuminated and the line portion 52 remains illuminated even when the scanning device 10 is being tilted forwardly as shown in FIG. 9 and rearwardly as shown in FIG. 10. It has been found that providing an illumination light having a width "h" of about 0.160 inches is sufficient to compensate for a scanning device tilt of up to about 10 degrees from the normal plane VV.

A further problem caused by the tilting of hand-held scanning device 10 is that the magnification of the line portion 52 is affected. When the scanning device 10 is tilted, the object 54 is no longer perpendicular to the image beam 56, as best illustrated in FIGS. 9 and 10. Accordingly, portions of the line portion 52 will be closer to the photosensor array 50 than will other portions. This results in the closer portions being magnified to a lesser extent than the further portions and the image of the closer portions focused on photosensor array 50 being smaller than the image of the further portions, thus resulting in some degradation of the quality of the image acquired by the scanning device 10.

It has been found, however, that the image degradation associated with magnification is relatively negligible and need not be corrected when the scanning device 10 is tilted not more than about 10 degrees from the normal plane VV during use. If, however, it is desired to enhance acquired image quality or to compensate for tilting of the scanning device 10 greater than 10 degrees from the normal plane VV, then a type of lens known as a "telecentric lens" may be used in place of the lens 48 previously described. Telecentric lenses are commonly used in the photolithographic industry and are configured to eliminate the variations in magnification caused by distance variation due to tilting, as described above, in a well-known manner.

Although the hand-held scanning device 10 has been described having a single roller 30, it is to be understood that a multi-part roller could alternatively be provided in which the axes of rotation of the roller parts are colinear. Such a configuration would provide for line contact between the scanning device and the object being scanned as described above.

As a further alternative, the roller 30 previously described could be replaced with a slide mechanism which allows sliding, rather than rolling, movement of the scanning device 10 across the object to be scanned 54 and which also provides for substantially line contact between the scanning device and the object to be scanned.

Figure 12:
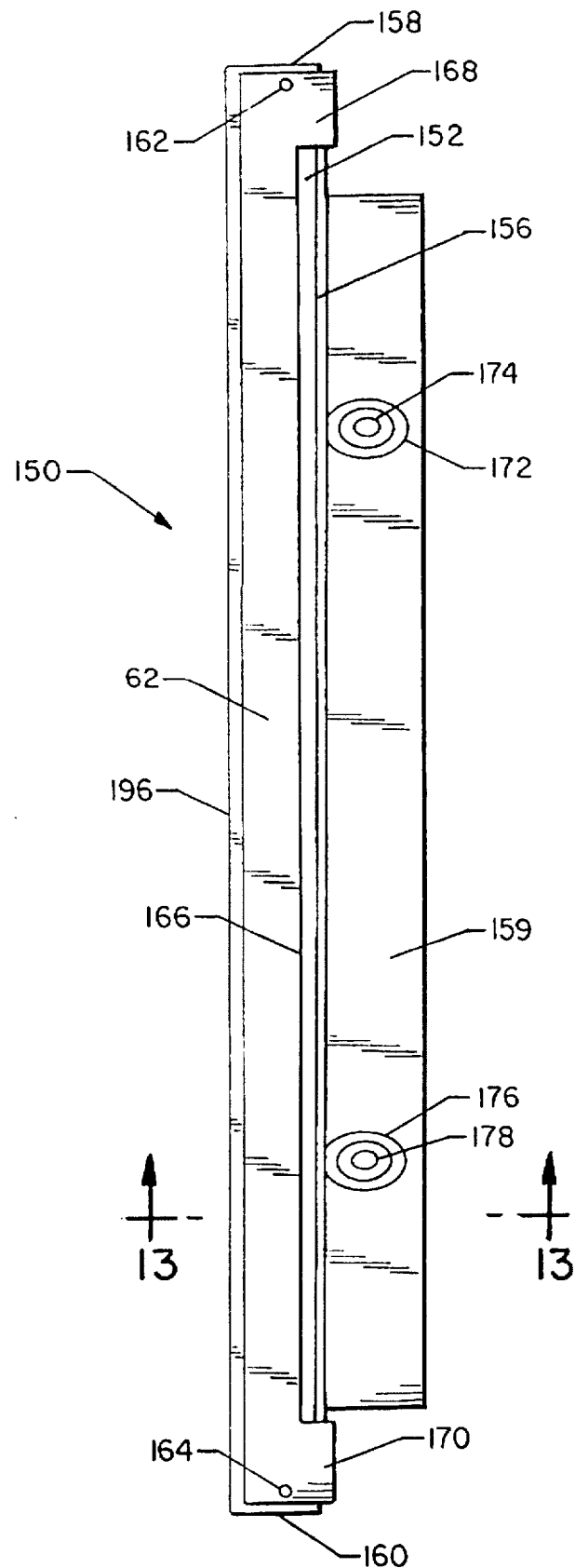
FIG. 12 is a top plan view of a window assembly for the hand-held scanning device of FIG. 1.
Figure 13:
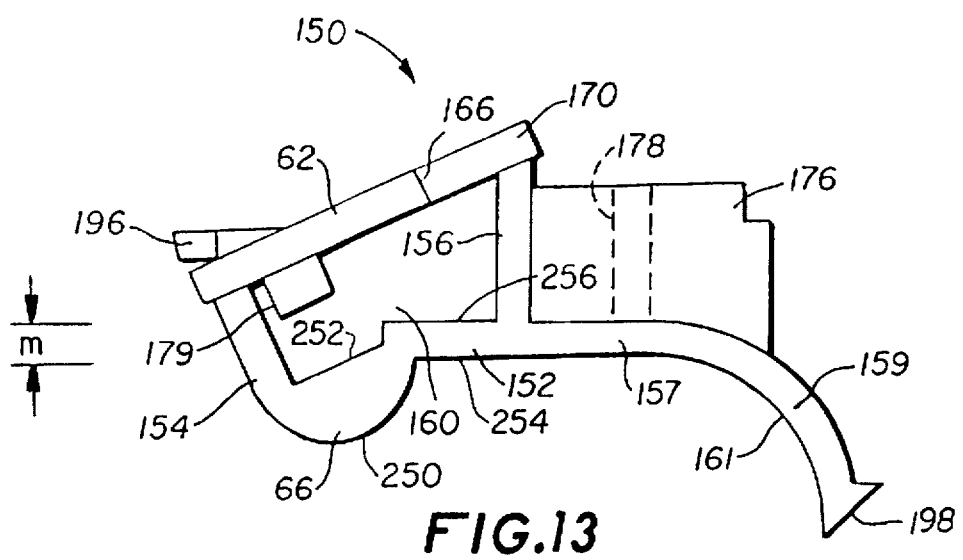
FIG. 13 is a cross-section view of the window assembly of FIG. 12 taken along the line 13—13 in FIG. 12.
Figure 14:
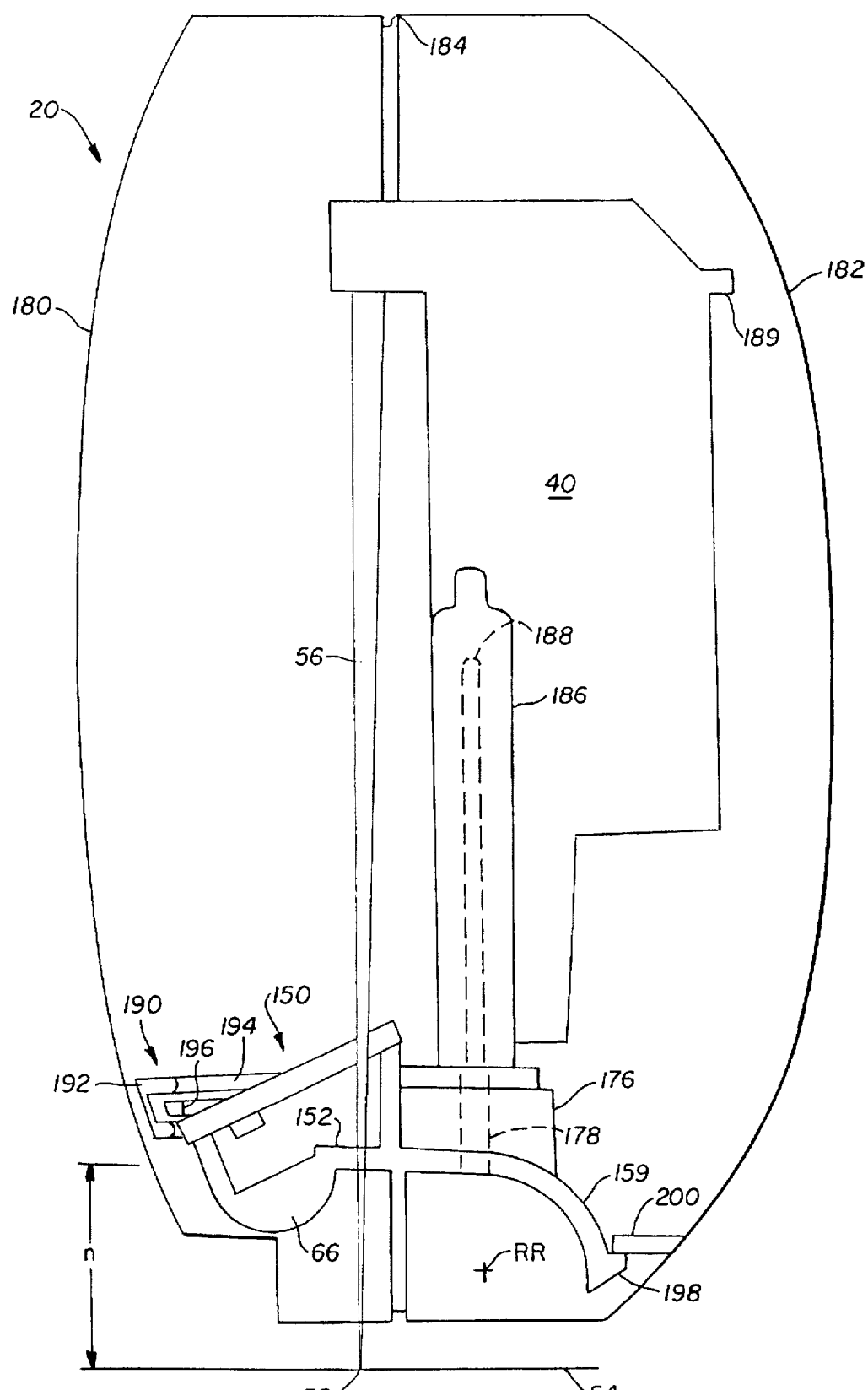
FIG. 14 is a cross-section view of the hand-held scanning device of FIG. 1 showing the mounting of the window assembly of FIG. 12, taken along the line 14—14 of FIG. 2.

FIGS. 12 through 14 illustrate a window assembly 150 which may be used to seal the scanning device housing 20 and, thus, prevent dust, moisture and other potential contaminants from entering the interior of the housing 20 and contaminating the optical components of the imaging assembly 40, FIGS. 4, 9 and 10, and associated scanning device electronics.

Referring to FIGS. 12 and 13, window assembly 150 may be integrally constructed to include both the light source lens 66, as previously described, and a transparent window portion 152. Transparent window portion 152 allows unobstructed passage of the imaging beam 56 from the line image 52 to the imaging system 40, as best shown in FIG. 14, while effectively sealing the scanning device housing 20 to prevent the entry of dust, moisture, and other contaminants.

Window assembly 150 may include a front wall portion 154, FIG. 13. The lens 66 may be located immediately adjacent the front wall portion 154 and may include a first curved surface 250 and a second substantially flat surface 252 which may be substantially perpendicular to the front wall portion 154. Window portion 152 may be located immediately adjacent lens 66 and may include substantially parallel first and second surfaces 254, 256. Located immediately adjacent window portion 152 is rear wall portion 156 which may extend substantially perpendicular to the window portion 152. Side wall portions 158, 160 may extend between the front wall portion 154, lens 66, window portion 152 and rear wall portion 156, FIGS. 12 and 13. A linear wall portion 157 may extend rearwardly from the juncture of the window portion 152 and the rear wall 156 as shown in FIG. 13. Linear wall portion 157 may transition into a curved wall portion 159 as shown in FIG. 13. Mounting blocks 172, 176 may be located immediately adjacent the rear wall 156, linear wall portion 157 and the curved wall portion 159 in the locations shown, e.g., in FIG. 12. The window assembly front wall portion 154, lens 66, window portion 152, rear wall portion 156, linear wall portion 157, curved wall portion 159 and the mounting blocks 172, 176 as described above may all be integrally formed.

The LED board 62, as previously described, may also be configured as an integral part of the window assembly 150. LED board 62 may be supported by window assembly 150 front and rear wall portions 154, 156, FIG. 13, and side wall portions 158, 160, FIG. 12. As best shown in FIG. 12, the LED board 62 may be secured to the remainder of the window assembly 150 by screws 162, 164 which may engage threaded openings, not shown, in the sidewall portions 158, 160 in a conventional manner. Alternatively, the LED board could be secured by gluing or by any other appropriate mechanism. LED board 62 contains a light source 179, FIG. 13, which, when the LED board is mounted as described above, aligns with the lens 66. When attached to the window assembly 150 as described above, the LED board 62 is substantially parallel to the lens surface 252 as shown in FIG. 13.

Attaching the LED board directly to the window assembly 150 in this manner reduces the likelihood of any misalignment between the light source 179 and the lens 66. Such misalignment could result in undesirable distortion of the illumination light beam 64. Also, since the lens 66 is formed in the window assembly 150, it is located at the outermost portion of the scanning device housing 20. Accordingly, there are no additional optical components through which illumination light beam 64 must pass before reaching the object 54. As can be appreciated, the integrally formed lens 66 described above serves two functions; to focus the illumination light beam 64 on the object 54 and to close the housing against the ingress of dust and other contaminants.

In order to allow unobstructed passage of the image beam 56, LED board 62 may be provided with a notch 166 defined by rearwardly extending leg portions 168, 170, FIG. 12. The leg portions 168, 170 facilitate secure attachment of the LED board 62 to the remainder of the window assembly 150 by providing engagement with the window assembly rear wall 156.

Curved wall 159 serves to distance the window portion 152 and lens 66 of the window assembly from the object being scanned 54, as will be explained in further detail. The curved inner surface 161 of the wall 159 provides clearance for the roller 30 (which has been removed from FIG. 14 for clarity) when the window assembly 150 is mounted in the scanning device housing 120.

Mounting blocks 172, 176 are provided with through-holes 174 and 178, respectively to facilitate attachment of the window assembly 150 to the scanning device optical assembly 40 as will be explained in further detail.

Referring to FIG. 14, it can be seen that the window assembly 150 closes the bottom part of the housing 20 while allowing unobstructed passage of image beam 56 through the window portion 152 and of light 64, FIG. 10, through the lens 66. In order to avoid relative movement between the window assembly 150 and the imaging assembly 40, the window assembly may be attached directly to the imaging assembly while being allowed to "float" with respect to the housing 20 as will be described in further detail. For proper operation of the hand-held scanning device 10, it is important that the window assembly 150 not move relatively to the imaging assembly 40. Such relative movement could, for example, cause distortion of the imaging beam 56 as it passes through the window portion or physical interference with the imaging beam by portions of the window assembly 150.

The optical assembly 40 may be provided with a plurality of mounting blocks, such as the mounting block 186 shown in FIG. 14. Mounting block 186 may have an opening 188 therein which may be threaded. Accordingly, window assembly 150 may be securely attached to optical assembly 40 by passing a bolt or screw, not shown, through the through-hole 178 in the window assembly mounting block 176 and threading it into the opening 188 of the optical assembly mounting block 186. A similar mounting process may be used with respect to the window assembly mounting block 172, FIG. 12.

In the manner described above, the window assembly 150 may be rigidly attached to the optical assembly 40. Housing 20 may be formed of a front housing portion 180 and a rear housing portion 182 which may be joined at a joint area 184. The front and rear housing portions 180, 182 may be held together by screws, not shown, or by any conventional mechanism. The optical assembly 40 may be attached to the rear housing portion 182. Threaded mounting blocks, such as the threaded mounting block 189, FIG. 14, may be provided on the exterior of optical assembly 40 to facilitate such attachment in a conventional manner.

During use and during transport of the hand-held scanning device 10, the housing 20 is often subjected to physical stresses. One example of a cause of such physical stress is when a user of the scanning device 10 squeezes the housing 20 while performing a scan. Since the housing 20 may be formed of plastic, which is relatively flexible, these stresses may cause relative movement to occur between various portions of the housing and, particularly, between the front housing portion 180 and the rear housing portion 182.

Because the optical assembly 40 is attached to the rear housing portion 182 and the window assembly 150 is rigidly attached to the optical assembly, relative movement may occur between the window assembly 150 and the front housing portion 180 due to the stresses described above. Accordingly, in order to effectively seal the housing 20 against entry of dust and other contaminants while accommodating this relative movement, the window assembly 150 may be designed to "float" with respect to the front housing portion 180 as will now be described in detail.

A seal mechanism 190 may be provided on the inside of front housing portion 180 as shown in FIG. 14. Seal mechanism 190 is generally U-shaped in cross-section and has a first length 192 extending along the front of the housing portion 180, a second length 194 extending along the right side of housing portion 180 and a third length, not shown, extending along the left side of housing portion 180. Window assembly 150 may be provided with an edge member 196, FIGS. 12–14, which, when the scanning device 10 is assembled, is positioned between the legs of the U-shaped seal mechanism 190 as shown in FIG. 14.

As can be seen from FIG. 14, a clearance is provided between the window assembly edge member 196 and the front housing portion seal mechanism 190. This clearance allows the front housing portion 180 to move relative to the window assembly 150 and, thus, prevents movement of the front housing portion 180 from causing relative movement between the window assembly 150 and the optical assembly 40.

Although allowing relative movement, the cooperating shapes of the window assembly edge member 196 and the front housing portion U-shaped seal mechanism 190 provide a tortuous path which effectively limits the amount of dust and other contaminants entering the housing 20.

The window assembly 150 may contain a lip member 198 located at the rear of the curved wall 159, FIGS. 13 and 14. This lip member cooperates with a rib 200, FIG. 14, which may be integrally formed with the rear housing portion 182 in order to seal the rear portion of the window assembly to the housing 20. Similar features, not shown, may be provided to seal the sides of the window assembly curved wall 159 to the sides of the rear housing portion 182.

As previously mentioned, the curved wall 159 of window assembly 150 causes both the window portion 152 and the lens 66 to be spaced from the object 54. Because the window portion 152 and lens 66 do not ride directly on the object 54, they are much less likely to be scratched or otherwise damaged during normal operation of the hand-held scanning device 10. Such scratching may result, for example, when a scanning device having an object-contacting window is moved across an object which is dirty or gritty or when a staple is encountered. A scratched or otherwise damaged window may distort the image beam 56 passing through the window and thus result in degradation of the quality of the image acquired by the hand-held scanning device 10. Similarly, a scratched or otherwise damaged light source lens may distort the light beam 64 passing through the lens and result in impairment of the light supplied by the light source 62 and, thus, also result in degradation of the image acquired by the hand-held scanning device 10. Image quality may also be adversely affected by a window which contains flaws not caused by contact with the object. Such flaws may be more prevalent in less expensive window materials.

The window portion 152, located as shown in FIG. 14, is removed from the focal area of the imaging assembly 40. Since optical systems of scanning devices must be focused on the object being scanned in order to maximize acquired image quality, locating the window adjacent the object, as in conventional scanning devices, necessarily places the window in the focal area of the optical system. Accordingly, any defects or flaws, such as scratches, on the window will be imaged on the photosensor array and thus will more significantly degrade the quality of the acquired image.

Window portion 152 may be located a distance "n" of at least about 0.30 inches above the object 54, FIG. 14 (when the hand-held scanning device 10 is not tilting). It has been found that this distance is sufficient to maintain the window 156 out of contact with the object during scanning operations and to adequately remove the window portion 152 from the focus area of the imaging system 40 when a lens having an f-number of about 4 and a depth of field of about 0.20 inches is provided. Most preferably, the window portion 152 may be located a distance "n" of about 0.55 inches above the object 54.

Window assembly 150 may be constructed of acrylic and be configured to contain both the window portion 152 and the lens 66 integrally formed therein. Window portion 152 may have a thickness "m" of about 0.080 inches, FIG. 13, and be formed of the same material as the remainder of the window assembly 150. Alternatively, window portion 152 may be a separate piece constructed of, e.g., glass and attached to window assembly 150 via, e.g., gluing.

In this manner, the window assembly 150 may be securely fastened to the scanning device housing 20 in a configuration which locates the window portion 152 out of the focus of the scanning device imaging system 40 and which prevents contact between the window portion 152 and the object being scanned. The window assembly 150 prevents entry of contaminants into the housing 20 while allowing unobstructed passage of the light beam 56 into the housing interior and may also support the LED board 62 thereon.

It will be appreciated that, although described with respect to a single roller hand-held scanning device, the above described window design could be used with any type of scanning device.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A photoelectric imaging apparatus for producing machine-readable data representative of imaged objects comprising:
    (a) a photosensor assembly;
    (b) optical components arranged along a light path extending between an object which is to be imaged and said photosensor assembly;
    (c) a light supplying mechanism positioned in illuminating relationship with said object;
    (d) a window assembly comprising:
        (i) a window portion located within said light path between said optical components and said object;
        (ii) a lens portion operatively associated with said light supplying mechanism; and
    (e) wherein said light supplying mechanism includes a light generating mechanism which is supported by said window assembly.

2. The apparatus of claim 1 wherein said window portion is configured to maintain a non-contact relationship with said object while said object is being imaged.

3. The apparatus of claim 1 further comprising an optical component positioning housing having an opening at one end thereof and wherein said window assembly substantially closes said opening.

4. The apparatus of claim 1 wherein said window portion comprises a clear plastic panel.

5. The apparatus of claim 2 wherein said window portion is located at least about 0.30 inches from said object while said imaging is taking place.

6. The apparatus of claim 3 wherein said window portion is located at least about 0.30 inches from said object while said imaging is taking place.

7. The apparatus of claim 1 wherein said lens portion and said window portion are integrally formed.

8. The apparatus of claim 1 further comprising an optical component positioning housing having an outer periphery and wherein said lens portion is located on said outer periphery.

9. The apparatus of claim 1 wherein said light generating mechanism comprises an LED light source.

10. A photoelectric imaging apparatus for producing machine-readable data representative of imaged objects comprising:
    (a) a housing having an outer periphery and a housing interior located within said outer periphery;
    (b) a photosensor assembly located within said housing interior;
    (c) a plurality of optical components located within said housing interior and arranged along a light path extending between an object which is to be imaged and said photosensor assembly;
    (d) a light supplying mechanism positioned in illuminating relationship with said object;
    (e) a window assembly comprising:
        (i) a window portion located within said light path between said optical components and said object;
        (ii) a lens portion operatively associated with said light supplying mechanism;
    (f) wherein said window portion is configured to maintain a non-contact relationship with said object while said object is being imaged;
    (g) wherein said window portion is located on said outer periphery; and
    wherein said light generating supplying mechanism includes a light generating mechanism which is supported by said window assembly.

11. The apparatus of claim 10 wherein said housing has an opening at one end thereof and wherein said window assembly substantially closes said opening.

12. The apparatus of claim 10 wherein said window portion comprises a clear plastic panel.

13. The apparatus of claim 10 wherein said window portion is located at least about 0.30 inches from said object while said imaging is taking place.

14. The apparatus of claim 11 wherein said window portion is located at least about 0.30 inches from said object while said imaging is taking place.

15. The apparatus of claim 10 wherein said lens portion and said window portion are integrally formed.

16. The apparatus of claim 10 wherein said light generating mechanism comprises an LED light source.

* * * * *

UNITED STATES PATENT AND TRADEMARK OFFICE
CERTIFICATE OF CORRECTION

PATENT NO. : 5,777,321
DATED : July 7, 1998
INVENTOR(S) : Ronald K. Kerschner and David K. Campbell Page 1 of 1

It is certified that error appears in the above-identified patent and that said Letters Patent is hereby corrected as shown below:

In the Specification:

Column 8,
Line 53: After "shorter." do not begin new paragraph (PTO's error)

In the Claims:

Column 14,
Line 65: Before "wherein" insert --(h)-- (PTO's error)
Line 65: After "light" delete "generating" (PTO's error)

Signed and Sealed this

Seventeenth Day of July, 2001

Attest:

*Nicholas P. Godici*

NICHOLAS P. GODICI
*Acting Director of the United States Patent and Trademark Office*

*Attesting Officer*